(12) United States Patent
Braun et al.

(10) Patent No.: US 8,301,476 B2
(45) Date of Patent: Oct. 30, 2012

(54) DETERMINING A POSSIBLE LOT SIZE

(75) Inventors: Heinrich Braun, Karlsruhe (DE);
Markus Riepp, Reilingen (DE);
Thomas Dehoust, Walldorf (DE)

(73) Assignee: SAP Aktiengesellschaft, Walldorf (DE)

( * ) Notice: Subject to any disclaimer, the term of this patent is extended or adjusted under 35 U.S.C. 154(b) by 972 days.

(21) Appl. No.: 12/096,360

(22) PCT Filed: Dec. 5, 2005

(86) PCT No.: PCT/EP2005/056493
§ 371 (c)(1),
(2), (4) Date: Sep. 16, 2008

(87) PCT Pub. No.: WO2007/065473
PCT Pub. Date: Jun. 14, 2007

(65) Prior Publication Data
US 2009/0019446 A1  Jan. 15, 2009

(51) Int. Cl.
*G06Q 10/00* (2012.01)
(52) U.S. Cl. .................................... 705/7.12
(58) Field of Classification Search ............. 705/7.12
See application file for complete search history.

(56) References Cited

U.S. PATENT DOCUMENTS

| | | | |
|---|---|---|---|
| 6,564,113 B1* | 5/2003 | Barto et al. | 700/99 |
| 6,725,113 B1* | 4/2004 | Barto et al. | 700/99 |
| 6,782,302 B1* | 8/2004 | Barto et al. | 700/101 |
| 6,801,819 B1* | 10/2004 | Barto et al. | 700/99 |
| 7,043,318 B1* | 5/2006 | Barto et al. | 700/100 |
| 7,068,351 B2* | 6/2006 | Van Den Nieuwelaar et al. | 355/53 |
| 7,069,097 B1* | 6/2006 | Barto et al. | 700/100 |
| 7,072,731 B1* | 7/2006 | Barto et al. | 700/102 |
| 7,337,032 B1* | 2/2008 | Nettles et al. | 700/100 |
| 7,463,939 B1* | 12/2008 | Mata et al. | 700/100 |
| 7,567,851 B2* | 7/2009 | Schmidt | 700/103 |
| 7,813,993 B1* | 10/2010 | Barto et al. | 705/37 |

OTHER PUBLICATIONS

[PDF] Multilevel lot sizing with setup times and multiple constrained resources: Internally rolling schedules with lot-sizing windows [PDF] from jstor.org H Stadtler—Operations Research, 2003—JSTOR.*
[PDF] A note on the single-machine multi-product lot scheduling problem[PDF] from jstor.org RW Haessler . . .—Management Science, 1976—JSTOR.*
[PDF] A survey of lot-sizing and scheduling models[PDF] from psu.edu at Staggemeier . . .—$33^{mt;epmuboubxmx}$ Simpósio Brasileiro de Pesquisa . . . , 2001—Citeseer.*
[PDF] Production lot sizing with machine breakdowns [PDF] from jstor.org H Groenevelt, L Pintelon . . .—Management Science, 1992—JSTOR.*
A heuristic method for lot-sizing in multi-stage systems[PDF] from psu.eduPM França, VA Armentano, RE Berretta . . .—Computers & operations . . . , 1997—Elsevier.*

* cited by examiner

*Primary Examiner* — Jonathan G Sterrett
(74) *Attorney, Agent, or Firm* — Blakely, Sokoloff, Taylor & Zafman LLP

(57) ABSTRACT

The invention provides methods and apparatus, including computer program products, for of determining a possible lot size of units with respect to a fixed date for a chain of at least two process steps, each process step requiring a respective assigned resource, and consuming a respective time per unit for being performed by the respective assigned resource, where the process steps are sequentially dependent on each other. This is achieved by the following:
(a) determining, for each resource, a respective time interval of availability during which the respective resource is continuously available, each time interval being limited by the fixed date,
(b) calculating, for each determined time interval of availability, a respective largest possible number of times the respective process step can be performed by the respective resource, and
(c) selecting the lot size of units to the minimum of the largest possible numbers.

31 Claims, 9 Drawing Sheets

Fig. 1a
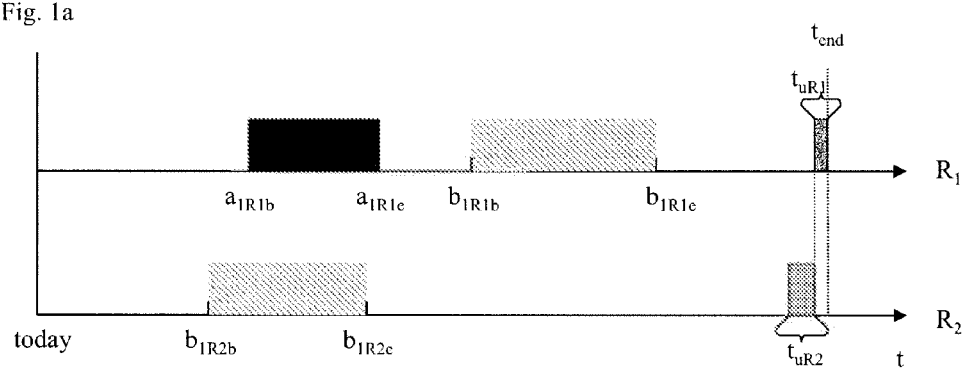
Fig. 1b
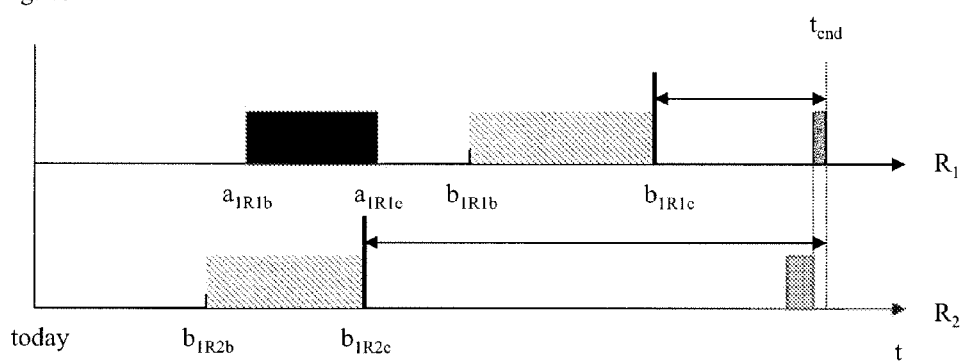
Fig. 1c
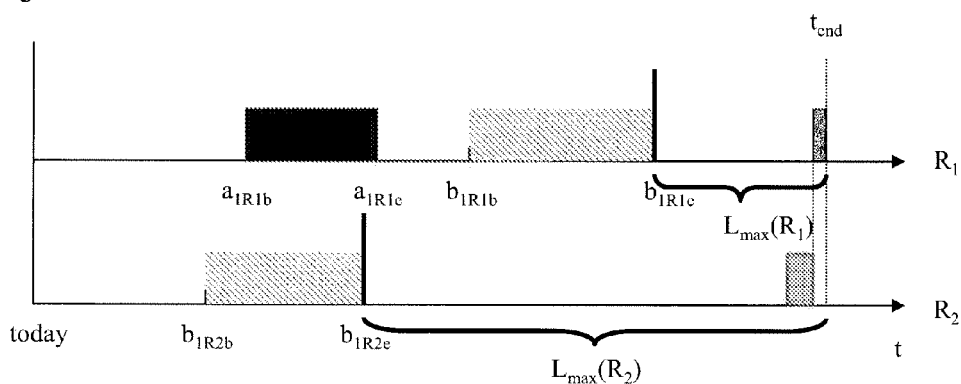
Fig. 1

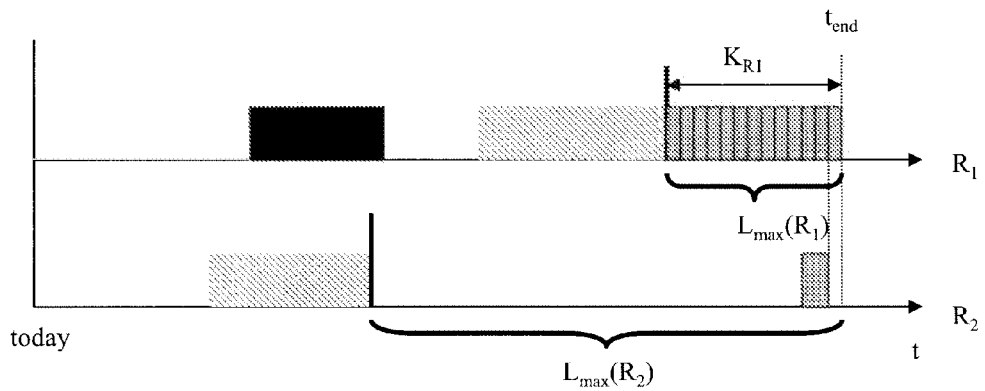
Fig. 1d
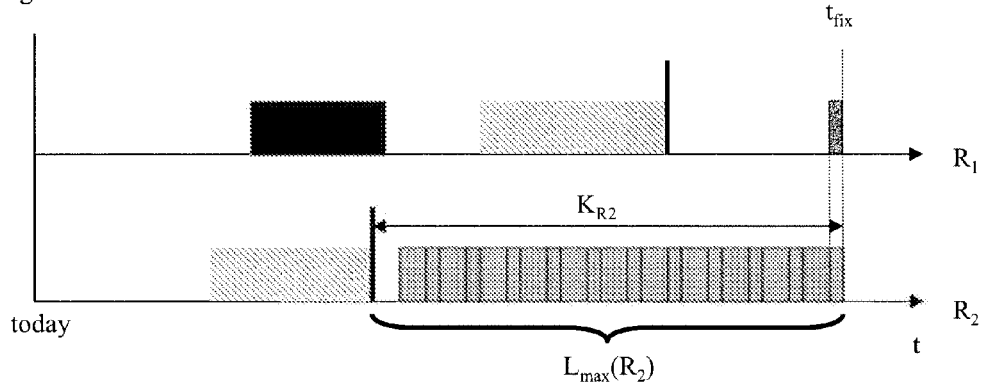
Fig. 1e
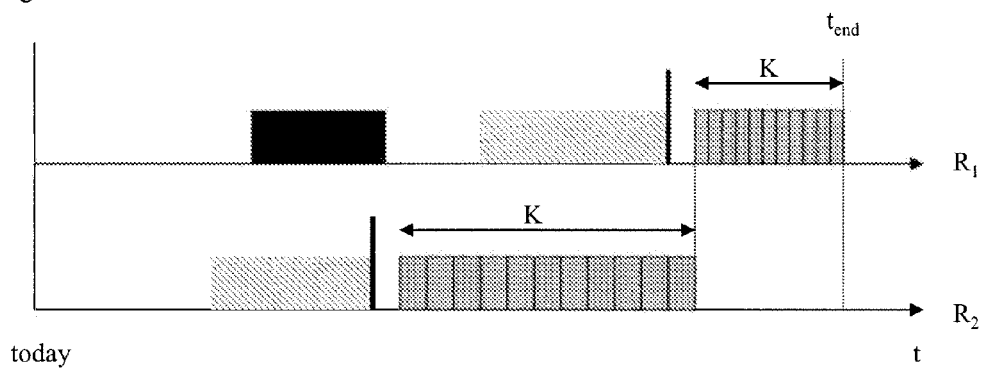
Fig. 1f
Fig. 1 (continued)

Fig. 4a
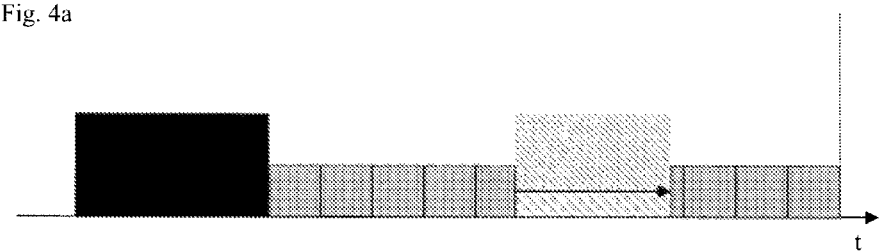
Fig. 4b
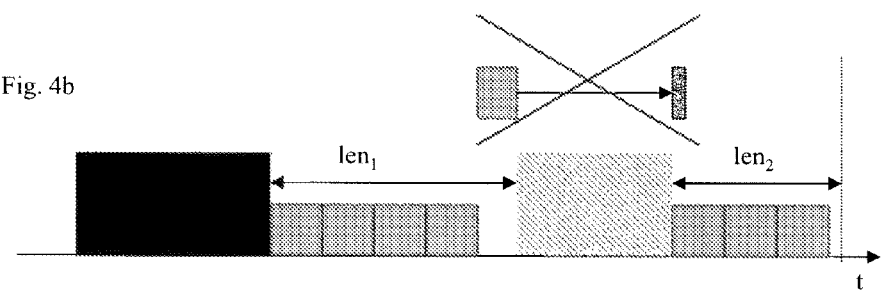
Fig. 4c
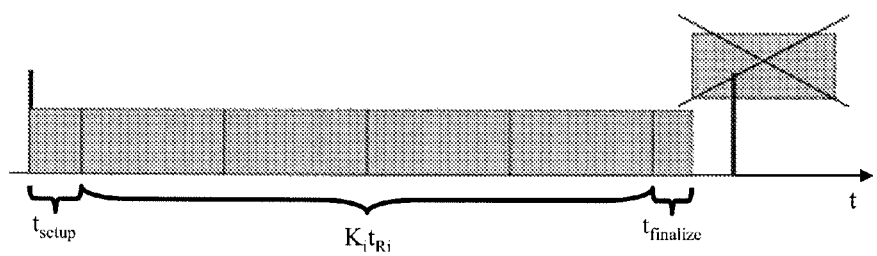
Fig. 4

Fig. 6a
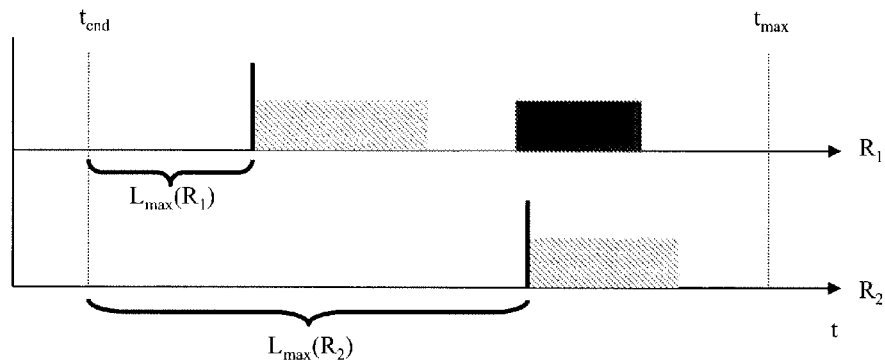
Fig. 6b
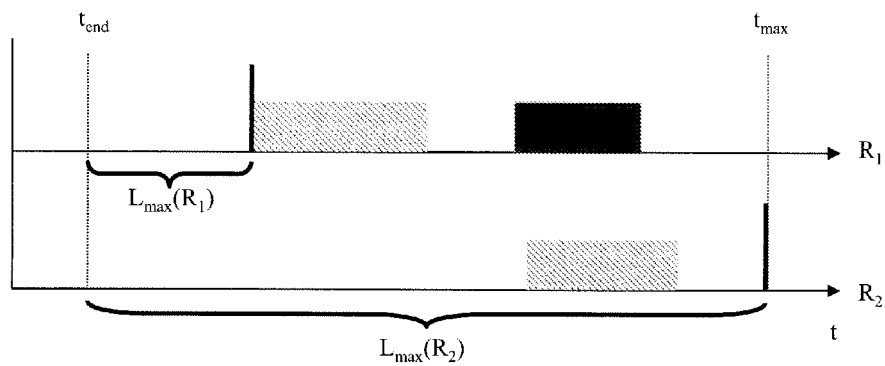
Fig. 6c
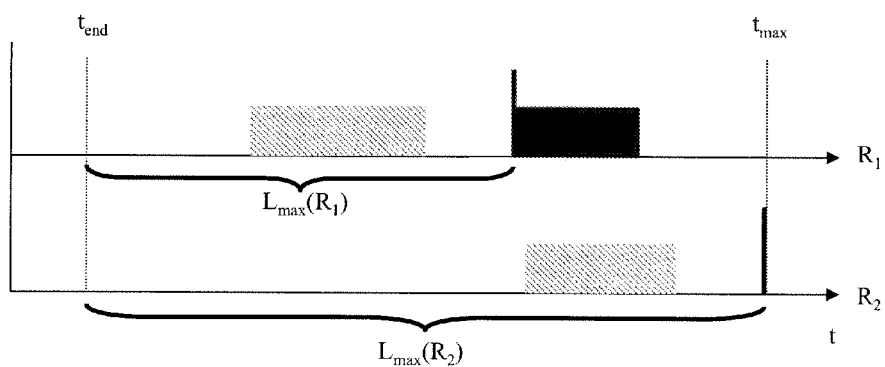
Fig. 6

DETERMINING A POSSIBLE LOT SIZE

This is a non-provisional application of International Application No. PCT/EP2005/056493, filed Dec. 5, 2005.

BACKGROUND OF THE INVENTION

This application relates to determining a possible lotsize with respect to a fixed date for a chain of at least a first and a second process step being sequentially dependant and requiring a first and a second resource, respectively.

STATE OF THE ART

A supply chain is a network of retailers, distributors, transporters, warehouses, and suppliers that take part in the production, delivery, and sale of a product or service. Supply chain management is the process of coordinating the movement of the product or service, information related to the product or service, and money among the constituent parts of a supply chain. Supply chain management also integrates and manages key processes along the supply chain. Supply chain management strategies often involve the use of software in order to project and fulfil demand and improve production levels.

In supply chain management, and also in other fields like production planning, a frequent problem is to schedule a chain or series of subsequent process steps, each requiring a constant time to be performed once, and where each subsequent step can only start after the previous step has finished.

The problem arises from the fact that the resources required to perform a process step are often shared, i.e. their availability order is limited over time. Of course, the intervals of availability where the required resources can be accessed for the process steps of the production or the supply chain should be optimally used.

In case of a multiple run through an identical chain of process steps, the optimization task is to determine the maximum possible lotsize of products for the given chain in a given time interval.

SUMMARY OF THE INVENTION

It is an object of the present invention to determine the maximum possible lotsize of a chain of process steps of the kind described in a fast and simple way.

In general, in one aspect, this invention provides a method of determining a possible lotsize of units with respect to a fixed date for a chain of at least two process steps, each process step requiring a respective assigned resource, and consuming a respective time per unit for being performed by the respective assigned resource, where the process steps are sequentially dependent on each other, the method including the steps of
  (a) determining, for each resource, a respective time interval of availability during which the respective resource is continuously available, each time interval being limited by the fixed date,
  (b) calculating, for each determined time interval of availability, a respective largest possible number of times the respective process step can be performed by the respective resource, and
  (c) selecting the lotsize of units to the minimum of the largest possible numbers.

Advantageous implementations can include one or more of the following features.

In an embodiment, the fixed date is a date of delivery, defining the end of the time intervals of availability. Then, the optimization is directed at the question of how many units can be produced at the date of delivery ("available to promise").

In an embodiment, the fixed date is a process start, defining the beginning of the time intervals of availability. Then, the optimization is directed at the question of how many units can be produced from now on ("maximal output from today").

In an embodiment, each number is calculated as truncated quotient of the length of the respective determined time interval, and the sum of the unit times of the respective step and each subsequent step. That way, the number is calculated in a fast way taking account of the serial dependence of the chain.

In an embodiment, each determined time interval is corrected by subtracting a respective lotsize-independent time, whereby each lotsize-independent time is the sum of the lotsize-independent time of the process step of the assigned resource and the lotsize-independent times of the subsequent process steps of the assigned resources. The lotsize-independent time compensates e.g. for startup, cooldown, or transport times.

In an embodiment, after selecting the lotsize, a current bottleneck resource is identified in an iterable replacement step a current bottleneck resource as the one of the resources corresponding to the minimum largest possible number, and if the corresponding interval of availability is limited by a break period, the time interval of availability is extended beyond the break period until the next limit, and the calculation and selection steps (b) and (c) are repeated with the extended bottleneck time interval of availability as the corresponding time interval of availability to recalculate the lotsize. Due to this feature, the method is refined to optimize the lotsize even in a case where the resources are not continuously available.

In an embodiment, the replacement step is iterated up to at least one of the following break conditions:
  the replacement step does not modify the lotsize;
  the replacement step does not modify the lotsize by at least a predefined minimum amount;
  no break limiting any interval of availability can be localized.

These are break conditions where the method either has converged to its optimum, or where further optimization cannot be expected to improve the result at acceptable cost. Further, the break conditions exclude the possibility of an infinite loop.

In an embodiment, all resources are assumed to be not available during the break whenever a break is included into the modified bottleneck interval of availability, and the calculation and selection steps (b) and (c) are repeated for all resources with their intervals of availability modified by the break. In other words, the break of one resource sort of "copies" to all other resources. This might be done to speed up optimization, and as a safeguard against certain situations where the method without this feature runs into sub optimal solutions.

In an embodiment, a fixed time span is subtracted from the modified bottleneck interval when a break is included into the modified bottleneck interval of availability, compensating for delays introduced by the break. Inclusion of a break might introduce additional startup, cooldown, transport, or other time intervals, and this feature compensates for such time intervals.

In an embodiment, the fixed time span depends on the resource and/or on the break. A fixed time span is not necessarily independent of the resource or the break. For example, a longer break can induce a longer startup or cooldown. On the other hand, this time differences may vary with the resource in question. The feature takes account of this variation.

In an embodiment, whenever one of the resources is not available, the other resource(s) are assumed to also not be available in step (a). This might be done to speed up optimization, and as a safeguard against certain situations where the method without this feature runs into sub optimal solutions, possibly at the cost of deliberately reducing the maximum lotsize that could be achieved without this feature.

The apparatus of the invention provides similar features and advantages, as are defined by the respective dependent claims.

In particular, the invention comprises also computer systems for performing the inventive methods.

Furthermore, the invention comprises computer-readable storage media comprising program code for performing the inventive methods, when loaded into a computer system.

One of the advantages is that the present invention provides a very fast and easily implemented method of determining the maximum possible lotsize. Since in many scheduling approaches this task of determining the maximum possible lotsize has to be computed frequently, it is important that the computation strategy is efficient. The inventive approach detects clusters of activities along the chain so that for all activities in one cluster, their lotsize and scheduling dates can be computed simultaneously.

BRIEF DESCRIPTION OF DRAWINGS

The invention will be described in detail below with reference to the included Figures and to further features and advantages of the invention. The Figures show in FIGS. 1a-1f an example explaining a first embodiment of the present invention with two chains;

FIGS. 4a-4c schematics illustrating a calculation step of the second embodiment according to FIG. 3;

FIG. 6a-6c an example explaining a fourth embodiment of the invention with a time axis reversed.

DETAILED DESCRIPTION

Figure 1:
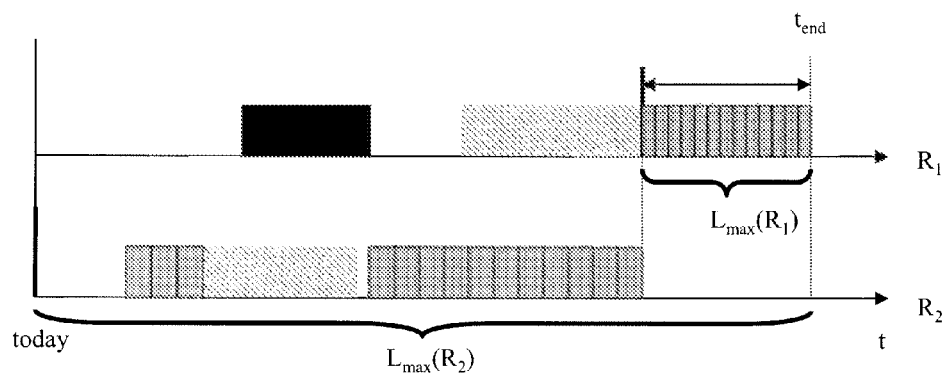
FIGS. 1g-1i an example explaining an iterative second embodiment of the present invention with two chains.
Figure 1:
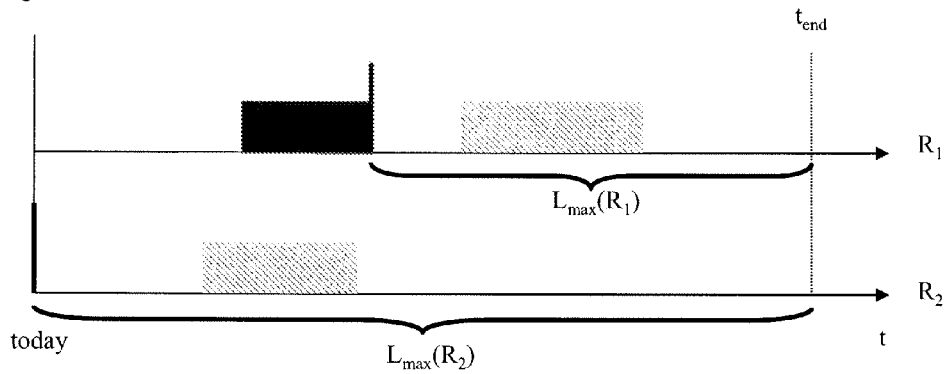
Figure 1:
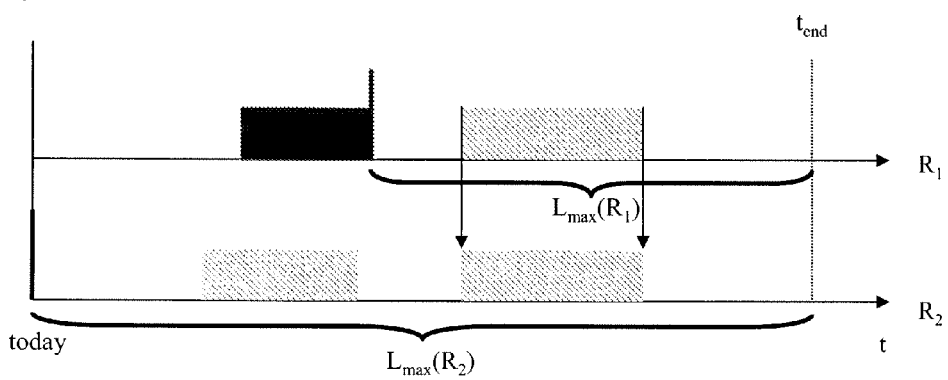
Figure 2:
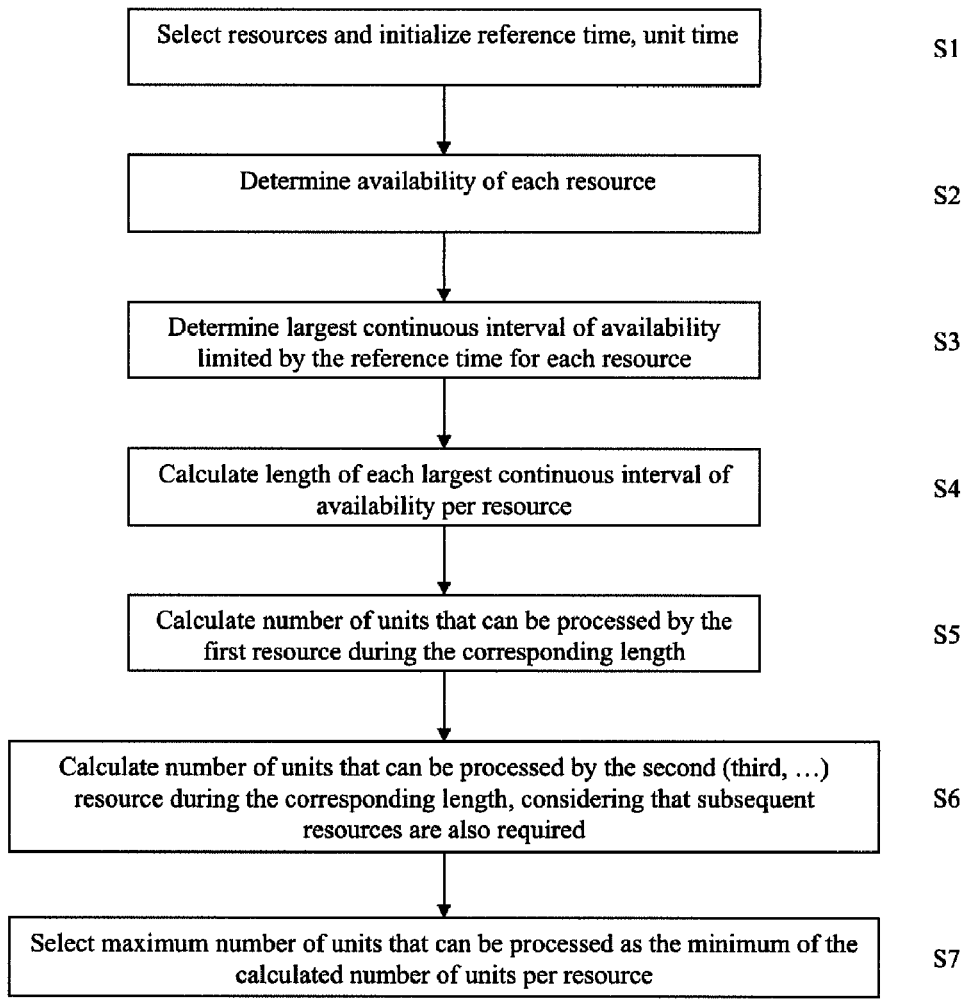
FIG. 2 a flow chart of the first embodiment explained with reference to the example of FIGS. 1a-1f.

FIGS. 1a-1f illustrate by way of example steps of a method of a first embodiment of the invention, a flow chart of the method being shown in FIG. 2. Note that the meaning of like elements of all Figures described in the context of one Figure is the same throughout all the Figures.

Consider a chain of process steps requiring two resources R1, R2 with R1 sequentially depending on R2, i.e. process steps requiring R1 can only start after all process steps requiring R2 have completely finished. In other words, resources R1 and R2 can only be assigned en bloc, and the chain cannot be parallelized for some reason, like resource R1 is not located near resource R2. It should be noted that the invention is not restricted to such chains of length two, which will be discussed in the context of further embodiments described below.

Moreover, the process steps are applied to a countable entity, consisting of an integer set of units, and application of the process step to each unit requires a constant time $t_{uRi}$, i=1, 2, respectively. In FIG. 1, $t_{uRi}$ is illustrated as the width of the gray shaded rectangles. The object of the method as shown in FIG. 2 is to determine the maximum number of units the chain can process while finishing exactly at a prescribed point in time $t_{end}$, illustrated as a vertical dashed line in FIG. 1. This maximum number of units is denoted as the maximum lotsize.

An example for the chain might be two processing steps to be applied to a work piece, like grinding and subsequent polishing the work piece. Grinding may be performed by a grinding machine (resource R2), while polishing may be performed by a polishing machine (resource R1). A further example may be producing (R2) and subsequent packaging (R1) an item. These examples are in no way restricting; any combination of resources for processing any kind of product meeting the above requirements is suitable.

The steps of the method will now be described in detail with reference to the flow chart of FIG. 2 and the respective explanatory illustration of FIGS. 1a-1f. In a step S1, the relevant resources R1, R2 are selected and variables $t_{end}$ and $t_{uRi}$ of the method are initialized. Obviously, the largest period of interest usually is from today to $t_{end}$. Nevertheless, although "today" is used as a marker in FIG. 1, for reasons of analysis, error detection, or others, the period might also start or even end in the past, with "today" replaced by any desired point in time.

In a step S2, the availability of resources R1 and R2 is determined. The result might be a set of variables $a_{jRib}$, $a_{jRie}$ defining beginning and end of a j-th interval of activity already booked for the i-th resource (black rectangle in FIG. 1) and a set of variables $b_{jRib}$, $b_{jRie}$ defining beginning and end of a j-th break for the i-th resource (hatched rectangle in FIG. 1).

An interval of activity means that the resource is occupied with processing something different than units of the chain. A break means that the resource cannot be used for any process whatsoever. Among the possible reasons are maintenance, shifts where no processing is possible (night), or holidays. In contrast to further embodiments to be described below, intervals of activity and breaks are treated without difference in the context of the first embodiment: the resource simply is unavailable. In the language of FIG. 1, the respective resource is available during any time interval not blocked by a black or hatched rectangle. For reasons of conciseness, the $a_{jRib}$, $a_{jRie}$ and $b_{jRib}$, $b_{jRie}$ are only shown in FIGS. 1a to 1c. Their definition in any of the other Figures is identical or at least analogous and is clear from the description.

In a subsequent step S3, the largest continuous time interval starting from $t_{end}$ backwards in time is determined for each resource, as illustrated by the double-headed arrows of FIG. 1b. In terms of the variables defined above, the largest $a_{jRie}$ or $b_{jRie}$, whichever the larger, is determined once for i=1 and once for i=2. Obviously, step 3 will come up with $b_{1R1e}$ and $b_{1R2e}$ as the result in case of the example illustrated in FIG. 1b. If no break or interval of activity can be identified, the largest continuous time interval is defined as the whole period of interest from "today" to $t_{end}$.

In a subsequent step S4, the lengths of the continuous time intervals found in step S3 are calculated. FIG. 1c illustrates that these are calculated as $L_{max}(R_1) = t_{end} - b_{1R1e}$ and $L_{max}(R_2) = t_{end} - b_{1R2e}$ in the example.

In a subsequent step S5, the number of units $K_{R1}$ that can be processed during the largest continuous time interval of the first resource is calculated. FIG. 1d illustrates how a maximum number of unit times $t_{uR1}$ is stacked within the time interval limited by the break at $b_{1r1e}$ and $t_{end}$. By chance, an integer number of unit times $t_{uR1}$ exactly fits within the interval. This will generally not be the case, such that $K_{R1}=[L_{max}(R_1)/t_{uR1}]$ with [ . . . ] being Gaussian brackets truncating the operand to the largest integer smaller than the operand.

In a subsequent step S6, the corresponding number of units $K_{R2}$ that can be processed during the largest continuous time interval of the second resource is calculated. Obviously, it is not sufficient to only consider the unit time $t_{uR2}$ since this would disregard the requirement of processing with resource $R_1$ prior to the fixed time $t_{end}$. FIG. 1e illustrates the calculation where the maximum number of added times $t_{uR1}+t_{uR2}$ are stacked within the time interval limited by the break at $b_{1r2e}$ and $t_{end}$. Here, the time interval cannot be completely exhausted since only a non-integer multiple of the sum of unit times $t_{uR1}+t_{uR2}$ fits within. Therefore, $K_{R2}=[L_{max}(R_2)/(t_{uR1}+t_{uR2})]$ In a final step S7, the maximum number of units K the chain can process is selected as the minimum $K=\min(K_{R1}, K_{R2})$ of the number of units for both resources. In the illustrated example of FIG. 1 a-1f, the second resource is the bottleneck, so $K=K_{R2}$. FIG. 1f shows how the solution K makes optimal use of resources $R_1$, $R_2$.

Figure 3:
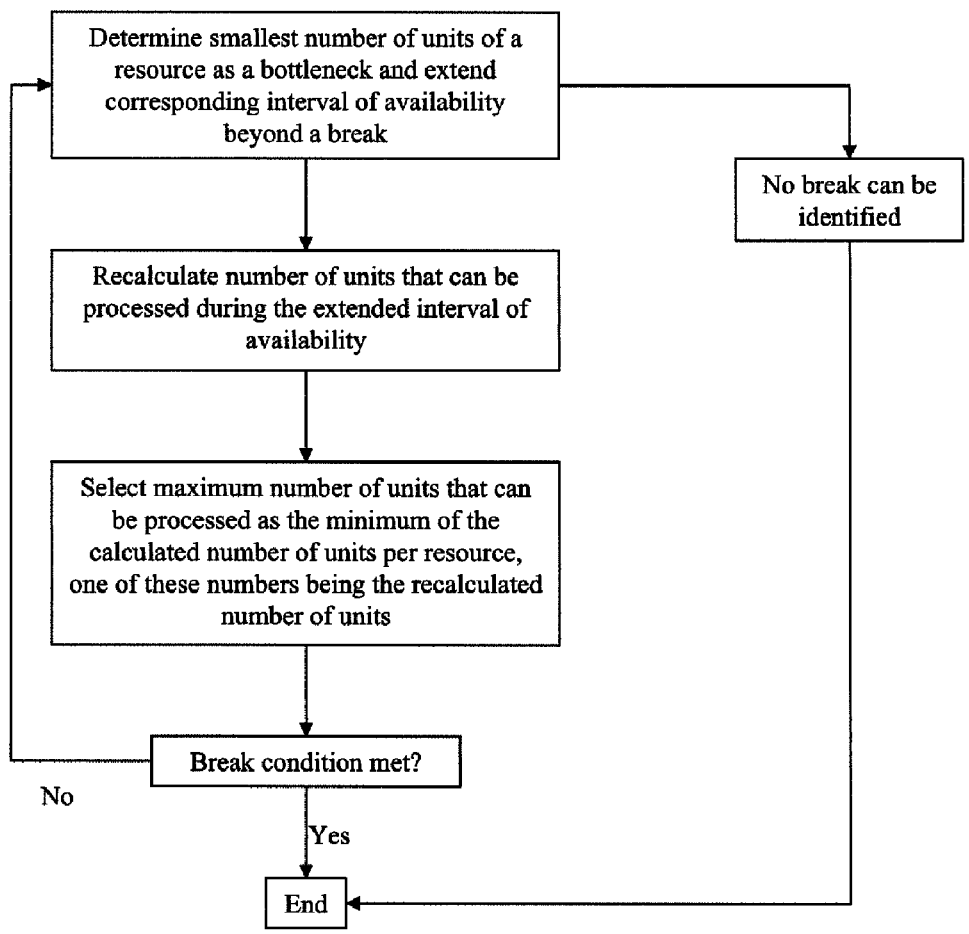
FIG. 3 a flow chart of the second embodiment extending the flow chart of FIG. 2 and explaining the second embodiment with reference to the example of FIGS. 1g-1i.

FIG. 3 shows the flowchart of a second embodiment of the invention. The first part of the method is identical to that of the first embodiment, i.e. the method according to the second embodiment starts where the method according to the first embodiment ends. In other words, steps S1 to S7 are identical for the first and second embodiments, and FIG. 3 only shows the subsequent steps.

In the context of the first embodiment, the difference of intervals of activity and breaks did not play any role. Now, in an extension refining the result K of the first embodiment, it is possible to interrupt a (formerly) continuous time interval of availability by one or more breaks. Still, intervals of activity may not occur during a time interval of availability. The second embodiment will now be described with reference to FIGS. 1g to 1i.

In a step S8, the resource determining the minimum in step S7 is identified as the bottleneck of the chain. If both (or neither) resources are bottlenecks, an arbitrary resource may be selected. As another option, the method can be terminated. However, this might be premature since removal of both "bottlenecks" might still result in a larger K.

In the example illustrated in FIGS. 1a to 1f, the bottleneck is $R_2$ since $K=\min(K_{R1}, K_{R2})=K_{R2}$. Then, it is checked whether the interval of availability is limited by a break. If it is limited by an interval of activity or by the start of the whole period marked "today", the method terminates.

In the other case, the interval of availability is extended backwards in time beyond the break limiting the interval of activity. To that end, the latest interval of activity or break outside the current interval of availability including the limiting break already identified is determined. If no such interval of activity or break can be identified, the whole period of interest between "today" and $t_{end}$ is selected as the interval of availability. In the example of FIG. 1, a break between $b_{1R2}$ and $b_{1R2e}$ is present, but no other breaks or intervals of activity can be identified. Hence, the new interval of availability is the whole period of interest interrupted by the single break.

In a subsequent step S9, the number of units $K_{Ri}$ of the bottleneck resource is recalculated for the extended interval of availability. In the simple case as illustrated in FIG. 4a that processing of a unit can be interrupted by a break without harm and without extending $t_{uRi}$ thereof, one can simply recalculate $L_{max}(R_i)$ as the whole interrupted interval of availability with the length of any breaks subtracted that lie therein. Then, $K_{Ri}=[L_{max}(R_i)-\Sigma_{Ri}(b_{jRie}-b_{jRib})/\Sigma_{k=1 \ldots, t_{uRk}}]$ with i the number of the bottleneck resource and j running through any break lying within the interval of availability. In the probably more realistic case that processing of a unit has to be finished before a break, $K_{Ri}$ is calculated piecewise, as illustrated in FIG. 4b. Then, for each continuous piece of the interval of availability, a distinct $K_{Ri,j}=[len_j/\Sigma_{k=1 \ldots, t_{uRk}}]$ is calculated with $len_j$ being the length of the respective piece, and $K_{Ri}$ is the sum of all $K_{Rij}$.

In a subsequent step S10, K is recalculated as the minimum $\min(K_{R1}, K_{R2})$ with one of $K_{R1}$, $K_{R2}$ modified as described by step S9. FIG. 1g illustrates that K has been increased due to the extension of the interval of availability beyond the break of resource $R_2$.

Following step S10, the method loops to step S8, trying to eliminate yet another bottleneck by including another break in the same way as described. There are several possible break conditions for the loop. One unavoidable break condition has already been mentioned in the context of step S8. If no break exists that might be included into an interval of availability, the resources simply have been exhausted, and further iterations are useless. In another embodiment, the break condition might be that an iteration did not improve K. Still another embodiment may define a maximum number of breaks that are to be considered, or a minimum of increase for K in an iteration.

FIG. 1h illustrates a second iteration of the method. With the bottleneck of $R_2$ removed in the first iteration, now the first resource has become the bottleneck. Consequently, in step S8 the interval of availability of resource $R_1$ is extended to include the break. Then, $K_1$ is recalculated in step S9, and the new K is determined in step S10 as described above.

Note that no third iteration is possible in the example: Resource $R_1$ has hit an interval of activity after the second iteration, and resource $R_2$ already begins "today". The chain cannot access either of the resources at any additional times.

It is not excluded that a K that was calculated in an iteration according to the second embodiment is overestimated. This may be the case if the resource $R_2$ needed at earlier times finishes processing during a break of resource $R_1$. Then, standstill at the break may prevent the forecast number of process steps for $R_1$ to be finished in time.

There are at least two possibilities to deal with this issue, beyond the obvious one of simply allowing for inexact results as a heuristic estimation. Firstly, one could constructively try to plan the chain with a calculated K. If it turns out to be impossible, the method reverts to the K of the previous iteration. Note that the result of the "zeroth" iteration according to the first embodiment excluding breaks never comes up with an overestimated K, meaning that reverting to the K of the previous iteration is always possible and meaningful. As an alternative, one could continue with one or more further iterations, repeating the check after each iteration. If all the checks fail, one may still revert to the K of the iteration prior to the overestimation.

Secondly, as shown in FIG. 1i, the method can be extended in another embodiment to prevent overestimation from the very beginning. Then, each time a break of one resource is included into an interval of availability during an iteration of the method, the break is projected to the other resource. That means, although the other resource might be perfectly available, a break is induced for the sake of the method where the resource is artificially made unavailable. That way, the overestimation is avoided. Of course, the artificial removal of part of an interval of availability might render K smaller than optimal.

A very conservative and simple way of implementing a similar safeguard would be to have all breaks projected to both resources at the start of the method, i.e. intervals of availability may only be defined in an intersection of availability of both resources.

FIG. 4c illustrates a possible modification of all embodiments. It was assumed that the number of process steps $K_i$ during an interval is determined by $t_{uRi}$ alone. It is possible to include a fixed time $t_{iend}$ representing setup times, cooldown times, transport times or the like that do not depend on the number of process steps, but are commonly needed to execute any process step of the resource $R_i$. FIG. 4c shows calculation of $K_{Ri}$ in that case. In the interval limited by the two vertical lines, a setup time $t_{setup}$ and a finalize time $t_{finalize}$ enclose 4 multiples of execution times $t_{uRi}$. A fifth execution time $t_{uRi}$ does only partially fit into the interval. As already discussed above in the context of FIGS. 4a and 4b, this can be met by truncation or by continuing with the remainder of the execution time after a break.

Obviously, all contributions of fixed duration can be summarized in a single $t_{ifix}$ for each resource i. Moreover, fixed durations may have to be considered once per resource, once after each break or even of individual length for each break, e.g. the longer $t_{ifixj}$ the longer the break j.

Figure 5:
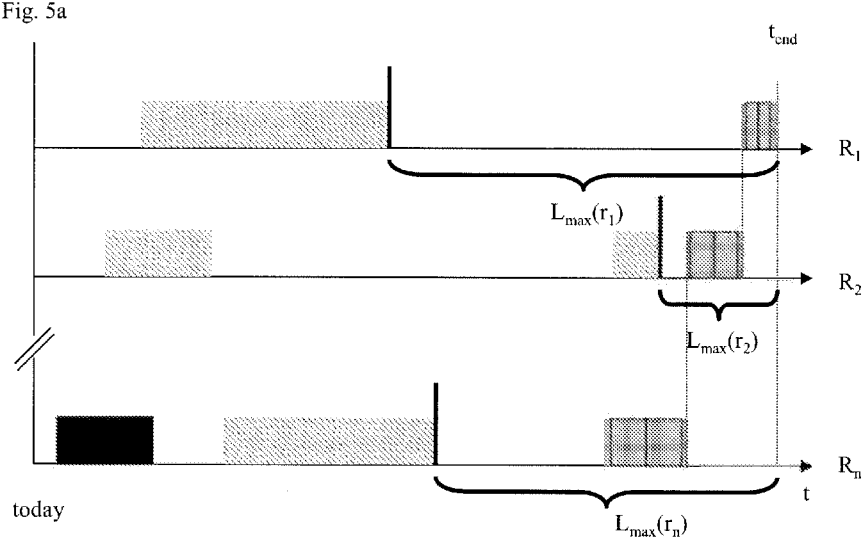
FIG. 5a-5c an example explaining a third embodiment of the invention generalizing to an arbitrary number of chains.
Figure 5:
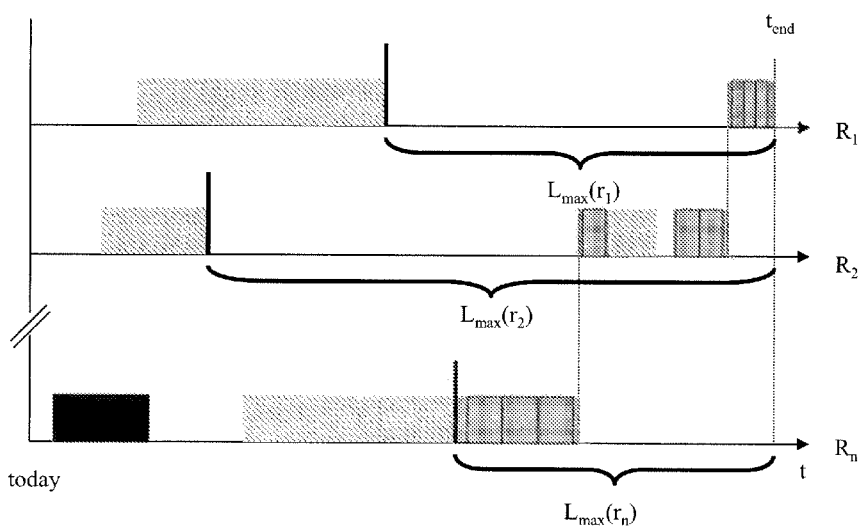
Figure 5:
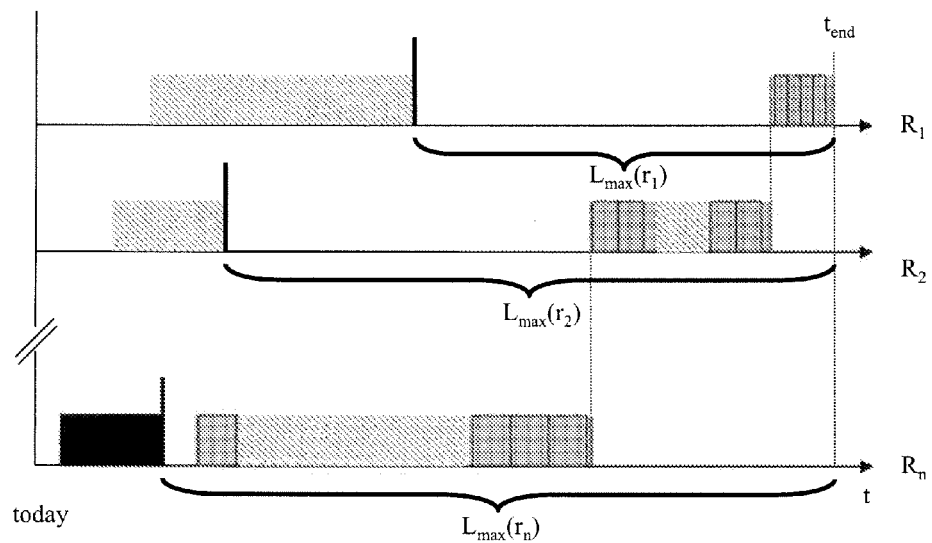

FIG. 5 illustrates an example of a third embodiment with an arbitrary number n of resources instead of only two resources. Actually, the flow charts of FIGS. 2 and 3 can also be applied to this case, and the generalization to n resources may be combined with any embodiment as described above. The only difference to the above description is that i runs from 1 . . . n instead of from 1 . . . 2. Out of the huge plurality of possible chains, one could as an example imagine weighing (R5), cutting to size (R4), painting (R3), polishing (R2), and packaging (R1) of a product. Remind that each unit has to be treated individually and needs a constant time $t_{uRi}$ for each individual treatment.

After initialization of $t_{end}$ and $t_{uRi}$ in a step S1, variables $a_{jRib}$, $a_{jRie}$ and $b_{jRib}$, $b_{jRie}$ are determined in a step S2 defining intervals of activity and breaks, respectively. For each break, a $t_{ifixj}$ may be determined to include fixed shares of the processing steps independent of $K_i$. These may or may not depend on the corresponding break j, e.g. its length, or be equal to zero since the resource can be immediately used after a break. In a lot of cases, a time $t_{ifix}$ independent of the break may suffice.

Steps S3 to S6 can be summarized as calculating the maximum $K_i$ in an interval limited by the current break (if any) and $t_{end}$. The details do not differ from that of the embodiments described above. In a general form, $K_i$ is calculated by $$K_i = \Sigma_j [(b_{j+1,Rib} - b_{jRie} - \Sigma_{k=1 \ldots i} t_{ifixj}) / \Sigma_{k=1 \ldots i} t_{uRk}].$$

Without restriction, the $b_{jRib}$ and $b_{jRie}$ are ordered in time for j=1 . . . $m_i$ with $m_i$ the total number of breaks detected for resource $R_i$. If the method detects them in a different order, they simply have to be sorted. Further, j runs through any break touching the interval of availability. To make the formula simple, we have defined $b_{mi+1Rib}:=t_{end}$ and $b_{0Ri}$ as the maximum of "today" and the end of the latest interval of activity of resource i. Hence, in the zeroth iteration of steps S3 to S6, the interval of availability is limited by $t_{end}$ and the end of the latest break. If there is no such latest break, automatically the correct value $b_{0Ri}$ of either the latest interval of activity or "today" is applied.

After selecting K=$\min_{i=1 \ldots n}(K_{Ri})$ in step S7, one embodiment has already come up with a solution. This is illustrated by FIG. 5a. The elements are analogous to FIG. 1. Three resources $R_1$, $R_2$, and $R_n$ are shown, with the broken y-axis symbolizing further resources in between. Hatched rectangles mark breaks, whereas black rectangles mark intervals of activity. The width of gray rectangles corresponds to respective $T_{uRi}$. They do not exactly match the time intervals where a resource is assigned, illustrating the fixed time shares $t_{ifixj}$. In the example shown, the complete chain can be executed two times.

During the iteration of steps 8 to 10, the bottleneck resource is identified and it is tried to remove it by extending the respective interval of availability beyond a limiting break. The method is the same as described above, with the bottleneck identified as (one of) the $K_{Ri}$ equaling K. Equation (1) holds for the iterations as well. Again, an arbitrary resource among these $K_{Ri}$ may be selected if the condition is not uniquely met.

The loop is finished by one of the possible break conditions described above. Moreover, overestimations mentioned above are even more frequent due to the plurality of resources and resulting possible break conflicts. Therefore, one may apply one of the correction methods described above.

FIGS. 5b and 5c show two further iterations of the example of FIG. 5a. In FIG. 5a, the bottleneck has been resource $R_2$ which cannot accommodate more than two units. Therefore, the break limiting $R_2$ is included in the interval of activity in a first iteration. Then, as shown in FIG. 5b, a third unit may be processed. Now, the bottleneck has become resource $R_3$. By including the break limiting $R_3$ in a second iteration, the total number K can again be improved to four.

FIG. 6 shows an example of a fourth embodiment of the invention. Here, the question is reversed from "am I available to promise" at a prescribed date of delivery to a "what is the maximum lotsize if I start" at a prescribed starting date, which also may be phrased as "how long do I need to achieve a lotsize of X". Of course, one has to add a further time constraint $t_{max}$ defining the latest end of a period of interest or any suitable additional break condition like achieving a prescribed K. Otherwise, the method might run infinitely.

Again, the example can be explained with reference to the flow chart of FIGS. 2 and 3. Again, the fourth time reversed embodiment can be combined with any of the embodiments described above. Initialization steps S1 and S2 have already been described. In step S3, the maximum interval of availability is determined starting from $t_{end}$ forward in time until the earliest break is detected, as shown in FIG. 6a.

In steps S4 to S6, the maximum unit numbers $K_{R1}$ and $K_{R2}$ are calculated e.g. by the formula of equation (1). In an embodiment, the method terminates with the zeroth' iteration result K.

In another embodiment, during iteration of steps S7 to S9 the interval of availability of a bottleneck is extended towards the future. FIGS. 6b and 6c show an example where the bottleneck has, firstly, been resource $R_1$ and, afterwards, resource $R_2$. In the break conditions for the iteration, $t_{end}$ has to be replaced with $t_{max}$. Apart from the differences just described, anything said in the context of previous embodiments is analogous. Of course, the planning from a starting date according to the fourth embodiment can also be applied to the case of n resources. All it takes is to remove the restriction i=1, 2 and use i=1 . . . n with equation (1) and the flow chart of FIGS. 2 and 3.

The present techniques can be implemented in digital electronic circuitry, or in computer hardware, firmware, software, or in combinations of them. Apparatus of the invention can be implemented in a computer program product tangibly embodied in a machine-readable storage device for execution by a programmable processor. Method steps according to the invention can be performed by a programmable processor executing a program of instructions to perform functions of the invention by operating on the basis of input data, and by generating output data. The invention may be implemented in one or several computer programs that are executable in a programmable system, which includes at least one programmable processor coupled to receive data from, and transmit data to, a storage system, at least one input device, and at least one output device, respectively. Computer programs may be implemented in a high-level or object-oriented programming language, and/or in assembly or machine code. The language or code can be a compiled or interpreted language or code. Processors may include general and special purpose microprocessors. A processor receives instructions and data from memories, in particular from read-only memories and/or random access memories. A computer may include one or more mass storage devices for storing data; such devices may include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by or incorporated in ASICs (application-specific integrated circuits).

The computer systems or distributed computer networks as mentioned above may be used, for example, for producing goods, delivering parts for assembling products, controlling technical or economical processes, or implementing telecommunication activities.

To provide for interaction with a user, the invention can be implemented on a computer system having a display device such as a monitor or LCD screen for displaying information to the user and a keyboard and a pointing device such as a mouse or a trackball by which the user can provide input to the computer system. The computer system can be programmed to provide a graphical or text user interface through which computer programs interact with users.

A computer may include a processor, memory coupled to the processor, a hard drive controller, a video controller and an input/output controller coupled to the processor by a processor bus. The hard drive controller is coupled to a hard disk drive suitable for storing executable computer programs, including programs embodying the present technique. The I/O controller is coupled by means of an I/O bus to an I/O interface. The I/O interface receives and transmits in analogue or digital form over at least one communication link. Such a communication link may be a serial link, a parallel link, local area network, or wireless link (e.g. an RF communication link). A display is coupled to an interface, which is coupled to an I/O bus. A keyboard and pointing device are also coupled to the I/O bus. Alternatively, separate buses may be used for the keyboard pointing device and I/O interface.

The invention claimed is:

1. A method of determining a possible lot size of units with respect to a fixed date for a chain of at least two process steps, each process step requiring a respective assigned resource, and consuming a respective time per unit for being performed by the respective assigned resource, where the process steps are sequentially dependent on each other, the method including:

(a) determining, by a hardware computer for each resource, a respective time interval of availability during which the respective resource is continuously available, each time interval being limited by the fixed date, (b) calculating, by the hardware computer for each determined time interval of availability, a respective largest possible number of times the respective process step can be performed by the respective resource, (c) selecting, by the hardware computer, the lot size of units to the minimum of the largest possible numbers, and (d) identifying, in an iterable replacement step, a current bottleneck as the one of the resources corresponding to the minimum of the largest possible number, and if the corresponding interval of availability is limited by a break period, the time interval of availability is extended beyond the break period until the next limit, and wherein the calculation and selection steps (b) and (c) are repeated with the extended bottleneck time interval of availability as the corresponding time interval of availability to recalculate the lot size, wherein the recalculated lot size $K_{Ri}$ is $[L_{max}(R_i) - \sum_j (b_{jRie} - b_{jRib}/\cdot_{k=1\ldots i}t_{uRk})]$ with $R_i$ being the current bottlenecked resource, $L_{max}(R_i)$ being a time interval of availability for the current bottlenecked resource $R_i$, $b_{jRib}$, $b_{jRie}$, defining the beginning and end of the j-th break for the current bottlenecked resource $R_i$ running from beginning time $t_{uR1}$ through end time $t_{uRk}$.

2. The method according to claim 1, wherein the fixed date is a date of delivery, defining the end of the time intervals of availability.

3. The method according to claim 1, wherein the fixed date is a process start, defining the beginning of the time intervals of availability.

4. The method according to claim 1, wherein each number is calculated as truncated quotient of the length of the respective determined time interval, and the sum of the unit times of the respective step and each subsequent step.

5. The method according to claim 1, wherein each determined time interval is corrected by subtracting a respective lot size-independent time, whereby each lot size-independent time is the sum of the lot size-independent time of the process step of the assigned resource and the lot size-independent times of the subsequent process steps of the assigned resources.

6. The method according to claim 1, wherein the time interval of availability $L_{max}$ for each resource is calculated as $L_{max}(R) = t_{end} - b_{end}$, wherein R is a resource, $t_{end}$ is the fixed date, and $b_{end}$ is an end time of a break for the resource R.

7. The method according to claim 1, wherein the replacement step is iterated up to at least one of the following break conditions:
 the replacement step does not modify the lot size;
 the replacement step does not modify the lot size by at least a predefined minimum amount;
 no break limiting any interval of availability can be localized.

8. The method according to claim 1, wherein, whenever a break is included into the modified bottleneck interval of availability, all resources are assumed to be not available during the break, and the calculation and selection steps (b) and (c) are repeated for all resources with their intervals of availability modified by the break.

9. The method according to claim 1, wherein, when a break is included into the modified bottleneck interval of availability, a fixed time span is subtracted from the modified bottleneck interval compensating for delays introduced by the break.

10. The method according to claim 9, wherein the fixed time span depends on the resource and/or on the break.

11. The method according to claim 1, wherein, whenever one of the resources is not available, the other resource(s) are assumed to also not be available in step (a).

12. The method according to claim 1, wherein for a first resource $R_1$ with a time interval of availability of $L_{max}(R_1)$, the respective largest possible number of times the respective process step can be performed $K_1$ by the resource $R_1$ during the time interval $t_{uR1}$ is equal to $K_1=[L_{max}(R_1)/t_{uR1}]$ and for a second resource $R_2$ with a time interval of availability of $L_{max}(R_2)$, the respective largest possible number of times the respective process step can be performed $K_2$ by the resource $R_2$ during the time interval $t_{uR2}$ is equal to $K_1=[L_{max}(R_1)/(t_{uR1}+t_{uR2})]$.

13. The method according to claim 12, wherein the lot size of units is calculated as $min(K_1, K_2)$.

14. The method according to claim 1, wherein when a unit must be finished before a break, for each continuous piece of the interval of availability $K_{Ri}$ is calculated individually as $K_{Ri,j}=[len_j\cdot_{k=1\ldots,t_{uRk}}]$ with $len_j$ being the length of the continuous piece of the interval of availability and $K_{Ri}$ is the sum of all $K_{Ri,j}$.

15. An apparatus capable of determining a possible lot size of units with respect to a fixed date for a chain of at least two process steps, each process step requiring a respective assigned resource, and consuming a respective time per unit for being performed by the respective assigned resource, where the process steps are sequentially dependent on each other, the apparatus including
 (a) determining means that, for each resource, determine a respective time interval of availability during which the respective resource is continuously available, each time interval being limited by the fixed date,
 (b) calculating means that, for each determined time interval of availability, calculate a respective largest possible number of times the respective process step can be performed by the respective resource, and
 (c) selecting means that selects the lot size of units to the minimum of the largest possible numbers, wherein the determining, calculating, and selecting means comprise hardware processors;
 (d) replacement means that, after the selection means selects the lot size of units, performs an iterable replacement step to identify a current bottleneck resource as the one of the resources corresponding to the minimum of the largest possible number, and extends the time interval of availability beyond the break period until the next limit of the corresponding interval of availability is limited by a break period; and
 (e) iteration means that addresses the calculating means and the selecting means to repeat the calculation and selection (b) and (c) with the extended bottleneck time interval of availability as the corresponding time interval of availability to recalculate the lot size, wherein the recalculated lot size $K_{Ri}$ is $[L_{max}(R_i)-\cdot_j(b_{jRie}-b_{jRib}/\cdot_{k=1\ldots,t_{uRk}})]$ with $R_i$ being the current bottlenecked resource, $L_{max}(R_i)$ being a time interval of availability for the current bottlenecked resource $R_i$, $b_{jRib}$, $b_{jRie}$, defining the beginning and end of the j-th break for the current bottlenecked resource $R_i$ running from beginning time $t_{uR1}$ through end time $t_{uRk}$.

16. The apparatus according to claim 15, wherein the determination means are adapted to define the fixed date as a date of delivery, defining the end of the time intervals of availability.

17. The apparatus according to claim 15, wherein the determination means are adapted to define the fixed date as a process start, defining the beginning of the time intervals of availability.

18. The apparatus according to claim 15, wherein the calculating means are adapted to calculate each number as truncated quotient of the length of the respective determined time interval, and the sum of the unit times of the respective step and each subsequent step.

19. The apparatus according to claim 15, wherein the determination means are adapted to correct each determined time interval by subtracting a respective lot size-independent time, whereby each lot size-independent time is the sum of the lot size-independent time of the process step of the assigned resource and the lot size-independent times of the subsequent process steps of the assigned resources.

20. The apparatus according to claim 15, wherein the time interval of availability $L_{max}$ for each resource is calculated as $L_{max}(R)=t_{end}-b_{end}$, wherein R is a resource, $t_{end}$ is the fixed date, and $b_{end}$ is an end time of a break for the resource R.

21. The apparatus according to claim 15, wherein the iteration means iterate the replacement and repetition of calculation up to at least one of the following break conditions:
 the replacement does not modify the lot size;
 the replacement does not modify the lot size by at least a predefined minimum amount;
 no replacement means can localize any break limiting any interval of availability.

22. The apparatus according to claim 15, wherein the replacement means are adapted to assume all resources to be not available during the break whenever a break is included into the modified bottleneck interval of availability, and wherein the calculation (b) and selection (c) are repeated for all resources with their intervals of availability modified by the break.

23. The apparatus according to claim 15, wherein subtraction means are provided that, when a break is included into the modified bottleneck interval of availability, subtract a fixed time span from the modified bottleneck interval compensating for delays introduced by the break.

24. The apparatus according to claim 23, wherein the subtraction means are adapted to determine the fixed time span depending on the resource and/or on the break.

25. The apparatus according of claim 15, wherein the determination means are adapted to determine the intervals of availability such that, whenever one of the resources is not available, the other resources are assumed to also not be available.

26. The apparatus according to claim 15, wherein for a first resource $R_1$ with a time interval of availability of $L_{max}(R_1)$, the respective largest possible number of times the respective process step can be performed $K_1$ by the resource $R_1$ during the time interval $t_{uR1}$ is equal to $K_1=[L_{max}(R_1)/t_{uR1}]$ and for a second resource $R_2$ with a time interval of availability of $L_{max}(R_2)$, the respective largest possible number of times the respective process step can be performed $K_2$ by the resource $R_2$ during the time interval $t_{uR2}$ is equal to $K_1=[L_{max}(R_1)/(t_{uR1}+t_{uR2})]$.

27. The apparatus according to claim 26, wherein the lot size of units is calculated as min($K_1$, $K_2$).

28. The apparatus according to claim 15, wherein when a unit must be finished before a break, for each continuous piece of the interval of availability $K_{Ri}$ is calculated individually as $K_{Ri,j}=[len_j \cdot_{k=1 \ldots, t_{uRk}})]$ with $len_j$ being the length of the continuous piece of the interval of availability and $K_{Ri}$ is the sum of all $K_{Ri,j}$.

29. A computer readable medium having program code stored therein that when executed by a processor cause the processor to:
    determine a possible lot size of units with respect to a fixed date for a chain of at least two sequentially dependent process steps, each process step requiring a respective assigned resource by:
    (a) determining, for each resource, a respective time interval of availability during which the respective resource is continuously available, each time interval being limited by the fixed date,
    (b) calculating, for each determined time interval of availability, a respective largest possible number of times the respective process step can be performed by the respective resource, and
    (c) selecting the lot size of units as the minimum of the largest possible numbers, and
    (d) identifying, in an iterable replacement step, a current bottleneck as the one of the resources corresponding to the minimum of the largest possible number, and if the correspond interval of availability is limited by a break period, the time interval of availability is extended beyond the break period until the next limit, and wherein the calculation and selection steps (b) and (c) are repeated with the extended bottleneck time interval of availability as the corresponding time interval of availability to recalculate the lot size, wherein the recalculated lot size $K_{Ri}$ is $[L_{max}(R_i)-\cdot_j(b_{jRie}-b_{jRib}/\cdot_{k=1 \ldots, t_{uRk}})]$ with $R_i$ being the current bottlenecked resource, $L_{max}(R_i)$ being a time interval of availability for the current bottlenecked resource $R_i$, $b_{jRib}$, $b_{jRie}$, defining the beginning and end break of the j-th break for the current bottlenecked resource $R_i$ running from beginning time $t_{uR1}$ through end time $t_{uRk}$.

30. The computer readable medium according to claim 29, wherein for a first resource $R_1$ with a time interval of availability of $L_{max}(R_1)$, the respective largest possible number of times the respective process step can be performed $K_1$ by the resource $R_1$ during the time interval $t_{uR1}$ is equal to $K_1=[L_{max}(R_1) t_{uR1}]$ and for a second resource $R_2$ with a time interval of availability of $L_{max}(R_2)$, the respective largest possible number of times the respective process step can be performed $K_2$ by the resource $R_2$ during the time interval $t_{uR2}$ is equal to $K_1=[L_{max}(R_1)/(t_{uR1}+t_{uR2})]$.

31. The computer readable medium according to claim 30, wherein the lot size of units is calculated as min($K_1$, $K_2$).

* * * * *

UNITED STATES PATENT AND TRADEMARK OFFICE
CERTIFICATE OF CORRECTION

PATENT NO. : 8,301,476 B2
APPLICATION NO. : 12/096360
DATED : October 30, 2012
INVENTOR(S) : Heinrich Braun, Markus Riepp and Thomas Dehoust Page 1 of 1

It is certified that error appears in the above-identified patent and that said Letters Patent is hereby corrected as shown below:

In the Claims, column 11, Claim 15, line 53, please delete "limit of" and insert --limit if--.

Signed and Sealed this
Fourteenth Day of May, 2013

Teresa Stanek Rea
*Acting Director of the United States Patent and Trademark Office*